US008188418B1

(12) United States Patent
Kondratko et al.

(10) Patent No.: US 8,188,418 B1
(45) Date of Patent: May 29, 2012

(54) SWITCHABLE HYBRID RECEIVER FOR COHERENT AND DIRECT OPTICAL DETECTION (75) Inventors: Piotr K. Kondratko, Broomfield, CO (US); Paul J. M. Suni, Berthoud, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 324 days.

(21) Appl. No.: 12/707,633

(22) Filed: Feb. 17, 2010

(51) Int. Cl.
*G01C 3/08* (2006.01)
(52) U.S. Cl. .................. 250/214 LS; 356/4.01
(58) Field of Classification Search ............ 250/214 LS; 356/4.01, 28, 614, 622; 382/106, 154, 210
See application file for complete search history.

(56) References Cited

U.S. PATENT DOCUMENTS

| 7,193,720 | B2 * | 3/2007 | Gatt | 356/489 |
| 7,397,568 | B2 * | 7/2008 | Bryce et al. | 356/484 |
| 7,532,311 | B2 * | 5/2009 | Henderson et al. | 356/4.01 |

OTHER PUBLICATIONS

Gatt, et al., "Laser Radar Detection Statistics: A Comparison of Coherent and Direct Detection Receivers", Laser Radar Technology and Applications VI, Proceedings of SPIE vol. 4377 (2001), pp. 251-262 , Sep. 19, 2001.
Ashcom, et al., "Coherent Single-Photon Counting With InGaAsP/InP Avalanche Photodiode Arrays",CLRC 2003, pp. 72-75.

* cited by examiner

*Primary Examiner* — Seung C Sohn
(74) *Attorney, Agent, or Firm* — McDermott Will & Emery LLP (57) ABSTRACT

Embodiments of the present invention provide a switchable dual-mode detection system that can be electronically or optically switched between direct and coherent detection. The dual-mode detection system comprises a photo detector and one or more switching elements used in conjunction with the photo detector to electronically or optically switch the detection system between direct and coherent detection. The switching elements may include a switchable detector driver that selectively biases the photo detector into a low gain mode for coherent detection and a high gain mode for direct detection, and/or a switchable optical subsystem that selectively mixes a local oscillator beam with the input signal beam for coherent detection and not for direct detection, and/or an amplifier switch that selectively directs the output photo current of the photo detector to one of two amplifiers, where one of the amplifiers is optimized for direct detection and the other for coherent detection.

23 Claims, 6 Drawing Sheets

SWITCHABLE HYBRID RECEIVER FOR COHERENT AND DIRECT OPTICAL DETECTION

STATEMENT REGARDING FEDERALLY SPONSORED RESEARCH OR DEVELOPMENT

Not applicable.

FIELD

The present invention generally relates to optical detection and, in particular, relates to receivers for coherent and direct optical detection.

BACKGROUND

Light detection and ranging (lidar) and laser detection and ranging (ladar) systems, hereafter collectively referred to as ladar systems, are remote sensing systems that send light from a transmitter to a target, detect light scattered from the target using a receiver, and infer properties about the target from the detected light. Inferred properties may include range, velocity, vibration, material, and other parameters. Generally these systems can be divided into two categories: direct detection ladar and coherent detection ladar, depending upon the method used for detection of the scattered light.

Direct detection systems are generally simpler to implement since the receiver only requires a detector that converts absorbed photons into electrical current and electronic components that amplify and filter the resulting electrical signal for further processing. Coherent detection systems are generally more complex to fabricate, in that the receiver must incorporate a local oscillator (LO) beam of light that is mixed with the received light to produce a signal proportional to the coherent addition of the local oscillator (LO) electric field and the signal field.

Historically, one or the other type of detection has been designed into ladar system architectures, primarily as a result of a priori decisions about what parameters the system must detect. All parameters can in principle be detected with coherent detection, whereas direct detection systems cannot make measurements that require retrieval of the signal optical phase. Important cases that involve phase retrieval include Doppler measurements of speed, velocity, and vibrations. It has generally also been the case that coherent detection systems provide greater sensitivity than direct detection systems. Appropriately designed coherent detection systems can detect the reception of single photons, whereas many direct detection systems have noise that limits the detection sensitivity to far higher levels.

Many ladar systems that operate in the field, for example, from aircraft, are severely limited in the amount of space they can occupy and the electrical power they can draw from the aircraft. In addition, operation with the greatest possible sensitivity is essential. Furthermore, operational scenarios in current and future systems place a high premium on multi-functionality, such that it is highly desirable for a single installed system to be capable of carrying out multiple measurements with high efficiency. This is particularly the case where size, weight, and power (SWaP) are at a premium, as is the case in land-based vehicles, aircraft, aircraft pods, UAVs (unmanned aerial vehicles), and MAVs (micro air vehicles). This trend to improved SWaP is anticipated to continue, resulting in a desire to increase the multi-functionality of measurement systems. It is also highly desired for ladar systems to be immune to jamming and background noise. Since direct detection receivers are sensitive to any photons of the correct wavelength that are absorbed by the photo detector, they are relatively sensitive to interference. Coherent detection systems, on the other hand, are only sensitive to photons that, when mixed with the LO, produce a beat frequency within the RF bandwidth of the receiver, and in addition, are propagating in the same single spatial mode as signal photons. For this reason coherent detection systems are generally many orders of magnitude less sensitive to interference.

SUMMARY OF THE INVENTION

Embodiments of the present invention provide a switchable dual-mode detection system that can be electronically or optically switched between direct and coherent detection. The dual-mode detection system comprises a photo detector and one or more switching elements used in conjunction with the photo detector to electronically or optically switch the detection system between direct and coherent detection. The photo detector may comprise low noise detector materials including, for example, mercury cadmium telluride (MCT), or device structures, such as impact ionization engineering ($I^2E$) structures. The switching elements may include a switchable detector driver that selectively biases the photo detector into a low gain mode for coherent detection and a high gain mode for direct detection, a switchable optical subsystem that selectively mixes a local oscillator beam with the input signal beam for coherent detection and not for direct detection, and/or an amplifier switch that selectively directs the output photo current of the photo detector to one of two amplifiers, where one of the amplifiers is optimized for direct detection and the other amplifier is optimized for coherent detection. In one embodiment, the switchable detector driver biases the photo detector into an avalanche gain regime or unity gain regime for coherent detection and into a sub-Geiger regime or Geiger regime for direct detection. In an alternative embodiment, the switching may be achieved by the action of the local oscillator light driving the detector operation from a high gain to a low gain.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

It is desirable to construct a ladar receiver that can be switched in real time between direct detection and coherent detection. This way, the decision between coherent or direct detection does not have to be made prior to the system design, but in real time in the field. Such switching can be realized by constructing a system comprising two separate receivers, in which each receiver is dedicated to one of the detection modes and a switch directs the signal beam to one of the two receivers based on the desired detection mode. A drawback with this approach is that it necessitates two separate receivers and a requirement that two receivers rather than one be aligned within the system. Embodiments of the present invention provide a compact receiver that can fulfill this dual-mode functionality with very high efficiency.

Prior attempts to provide switchable coherent/direct detection functionality in a single device have been impractical and far from efficient. For example, Ashcom et al. ("Coherent single-photon counting with InGaAsP/InP avalanche photo-diode arrays", Coherent Lasar Radar Conference, Bar Harbour, Me. 2003, hereby incorporated by reference) described a system based on single-photon sensitive Geiger-mode Avalanche Photo-Diodes (GAPD), in which they described both coherent and direct detection measurement capability. However, this system is ill suited for practical implementations. The Ashcom detector always operates in the Geiger state where single photons produce macroscopic electrical pulses. These pulses are persistent and must be quenched, followed by a long waiting period (typically 1-2 microseconds) before the detector can be rearmed and ready to detect the next photon.

Heterodyne coherent detection receivers produce a temporal beat signal at the frequency difference between the LO and the input signal. A useful way to look at this process is to view the LO as a constant power signal impinging on the detector and the signal mixing as producing a temporal modulation of the DC signal. Since ladar systems are typically looking at extremely weak signals, the LO power is generally many orders of magnitude greater than the signal power. However, since a GAPD system is sensitive to single photon events and can only rearm at a rate on the order of or less than 1 MHz, the LO power has to be extremely weak in order not to constantly trip the GAPD device. In fact, for such a system to operate near an optimal state, the LO should have approximately the same power as the signal. The problem is that the signal level is not a priori known and typically varies by several orders of magnitude due to variations in target reflectivity, speckle, atmospheric attenuation, refractive turbulence, depolarization and other effects. Consequently no practical means exists to operate the coherent detection scheme near an optimal state.

Embodiments of the present invention provide for the construction of dual-mode coherent/direct detection systems that are capable of switching operation between coherent and direct detection in real time. The dual-mode detection system according to embodiments of the present invention are based on the fact that coherent detection is not always more desirable in terms of sensitivity than direct detection, even if system complexity were not an issue. When this fact is combined with recent advances that enable near photon counting sensitivity of solid-state detectors in the infrared spectral range, an optimized receiver can be constructed that enables both detection modes without the drawbacks of the Geiger-mode system discussed above.

Embodiments of the present invention incorporate one or more of the following features: a detector operating in the linear detection mode in or near the photon-counting regime, an optical subsystem for mixing the received signal with a local oscillator signal, and a switch for enabling or disabling the local oscillator to select coherent or direct detection for a given measurement. The detection system may optionally incorporate electronics circuitry that is controlled via a control signal and which permits the detected signals to be selectively routed to one of two different detection channels that are independently optimized for the detection of signals in the presence and in the absence of a local oscillator signal. Further improvements may incorporate adjustable attenuators or multiple receivers that enable already high dynamic range to be significantly enhanced. The result of these improvements over the prior art provide one or more of the following advantages:

A system that enables far higher dynamic range;

A system that can be switched between direct detection and coherent very rapidly under electronic or optical control;

A system that does not need to adjust the LO power level to optimize coherent detection, but can operate with a preset LO level, which strongly improves practical use;

Obtaining both operating modes without the need for cryogenic cooling;

With selection of the proper detector material, a photo detection efficiency (PDE) of close to unity can be achieved; and An efficient architecture that lends itself to array scaling for selectable pixel coherent or direct mode of operation.

Before discussing embodiments of the present invention in further detail, it may be instructive to discuss ladar system sensitivities for direct and coherent detection.

Direct detection receivers respond to the signal power $P_s$ received from a target by producing an electrical signal responsive to this power. In semiconductor detectors, an electrical current $I = \rho P_s$ is produced, where $\eta$ is the responsivity of the detector measured in A/W. In many ladar systems, the optical signal powers are so low that individual quanta of light, photons, are detected. For this to be possible, direct detection receivers must exhibit extremely low noise and must incorporate very high gain to produce measurable signal levels.

In coherent detection systems, the received optical signals are optically mixed with a local oscillator (LO) light beam. This effectively produces an amplification effect and the total optical power as seen by the detector is proportional to:

$$P_T = P_{LO} + P_S + \sqrt{P_{LO}}\sqrt{P_s} \sin[(\omega_{LO} - \omega_S)t - \theta(t)] \quad (1)$$

where $P_{LO}$ is the local oscillator power, $\omega_{LO}$ is the LO angular frequency, $\omega_s$ is the angular frequency of the received signal, t is time, and $\theta$ is an additional phase contribution that may be time dependent. The first two DC terms are usually not of interest for signal extraction purposes while the last term contains information about both the signal amplitude and its phase relative to the LO phase. Since the LO power can be quite large, the factor multiplying the sine wave can be large even when the signal power is extremely small.

Thus, it is generally the case that both detection modes desire detection sensitivities down to the single-photon level, but due to the absence or presence of a local oscillator laser beam the actual power level incident on the detector may differ by many orders of magnitude between the two modes.

Figure 1:
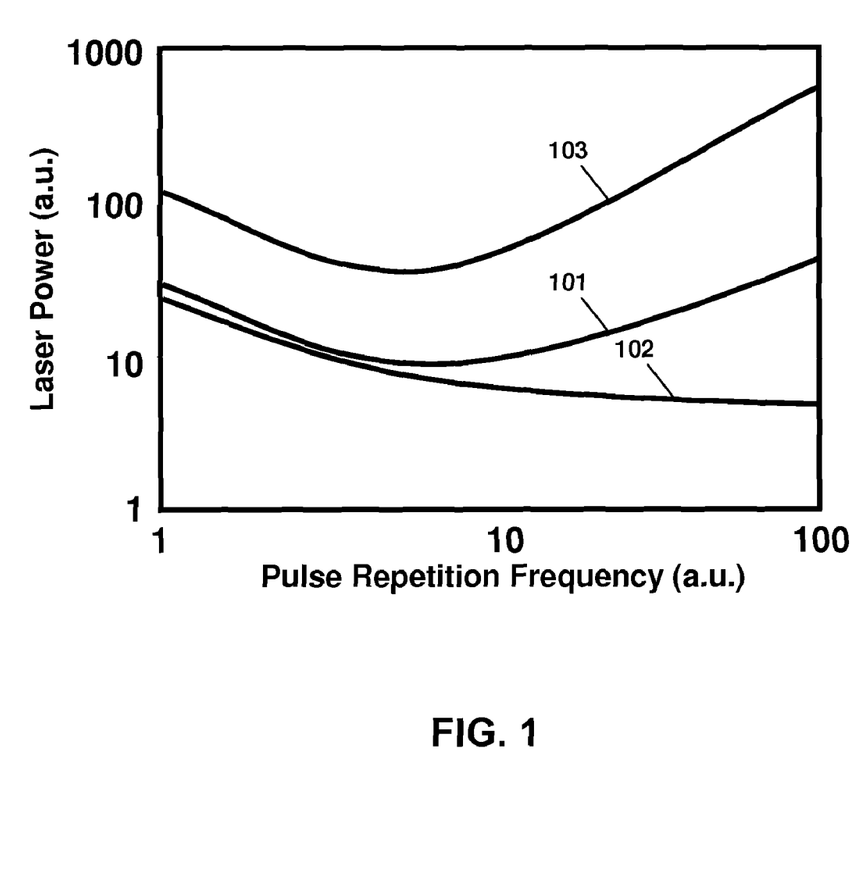
FIG. 1 is a plot of laser power versus pulse repetition frequency of a transmitter used in a ladar system.
Figure 3:
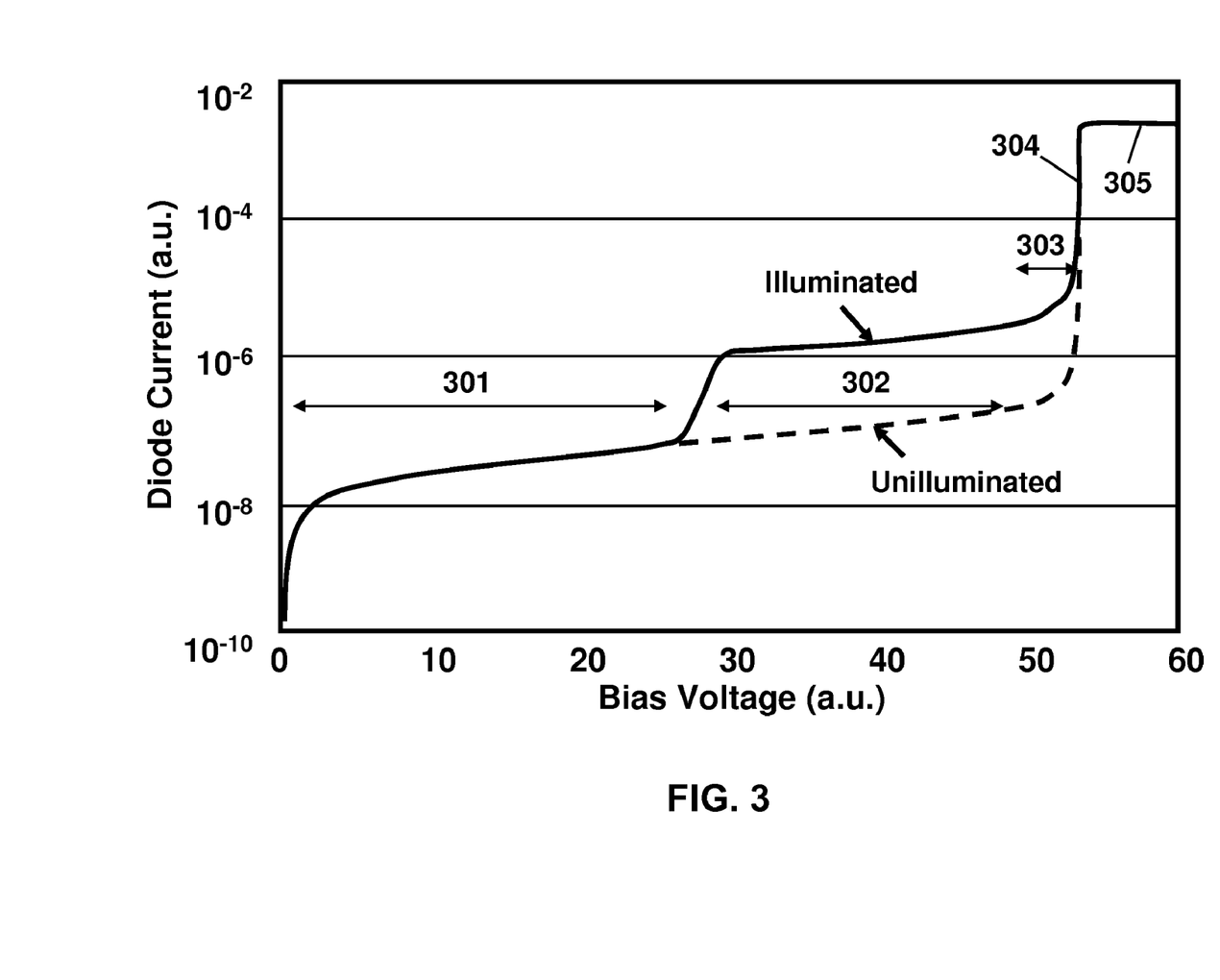
FIG. 3 is a plot illustrating different operating regimes of an avalanche photo diode.

Ladar systems are normally designed to maximize absolute receiver sensitivity for a given measurement. A consideration in the design of ladar systems is how many photons must be received from a target in order to achieve a specified level of measurement certainty, often measured by the probability of detection ("PD") and the probability of a false alarm ("PFA"). There is no single answer and careful trade analysis is frequently required, as for example described by P. Gatt and S. W. Henderson in "Laser Radar Detection Statistics: A Comparison of Coherent and Direct Detection Receivers", Proceedings of the SPIE, Vol. 4377, pp. 251, 2001, hereby incorporated by reference. This analysis indicates that the choice between direct detection and coherent detection is highly dependent on the noise characteristics of the detector and receiver electronics, as well as the target type (which influences in particular the speckle statistics at the receiver). An example of a result from such an analysis is shown in FIG. 1. FIG. 1 shows a plot of the required laser power versus the pulse repetition frequency (PRF) of a transmitter used in a ladar system. Because lasers are often large and consume considerable electrical power it is desired to minimize the required laser power. In doing so one has to consider whether it is better to send one high energy pulse to a target or many low energy pulses. Curve 101 in FIG. 1 shows a typical behavior for a coherent detection system. At a low PRF (few pulses in a given total measurement time), the required power increases as a result of speckle fading. At high PRF, the required power also rises because the system sensitivity is limited by receiver shot-noise. Consequently a minimum laser power regime exists that one may strive to meet. On the other hand, curve 102 shows the behavior of a direct detection system operating under very low noise conditions. At low PRF, this system is also affected by speckle. However, at high PRF, there is no increase in noise due to shot-noise and hence the direct detection system can operate with less laser power than the coherent system. A caveat is that if the detection noise (due to background or intrinsic detector/electronics) increases, then one can face a curve 103 as illustrated in FIG. 3. In this case, the direct detection system always requires more power than an equivalent coherent system and the latter would be preferred. In many real applications, a given system may encounter a variety of measurement conditions and, while the above is a generic discussion, it illustrates the desire to be able to switch between detection modes at will and in real time.

Figure 2:
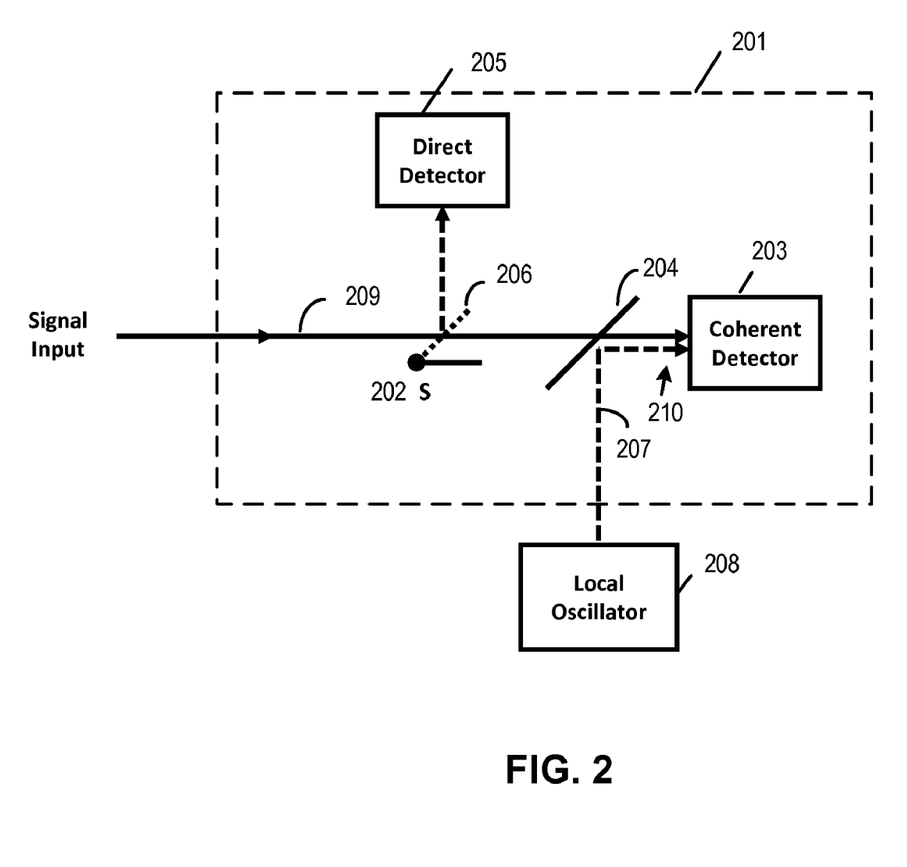
FIG. 2 illustrates a hybrid optical receiver using two separate detectors for direct detection and coherent detection.

FIG. 2 shows a dual-mode detection system illustrating one way of switching between coherent and direct detection modes. In this example, a received optical signal enters the receiver 201, where it first encounters a switching element S 202. The switch S 202 may be a mechanical mirror or a polarization-based switch which can be controlled to either direct the optical signal toward the coherent detector 203 via a beam splitter 204 or direct the optical signal toward the direct detector 205 when the switch S 202 is configured in the alternative position illustrated by dashed line 206. In order for the coherent path to operate properly, it is also necessary to provide a local oscillator laser beam 207 from a local oscillator laser 208. For coherent detection, the local oscillator beam 207 is mixed with signal beam 209 at the beam splitter 204 to form a mixed beam 210 that is inputted to the coherent detector 203.

The dual-mode detector system in FIG. 2 has drawbacks in practical situations. The two detectors add cost, weight, and power consumption to the system. Furthermore, alignment is critically important in ladar systems and the need for two detectors adds to the system complexity by requiring that two detectors be carefully aligned rather than one. Finally, depending upon the choice of detector type and material, the direct detector may have to be operated at cryogenic temperatures, which is frequently a significant drawback for practical applications. Accordingly, it is desirable for a system to have one detector that can be electrically or optically switched between the two detection modes in real time.

In certain embodiments of the present invention, an avalanche photo diode (APD) is used for detection. Therefore, an understanding of the operation of an APD and the role of excess noise in ladar systems is important. An APD can be characterized by its I-V curve which indicates how much current the APD draws as a function of the reverse bias applied to the APD. A typical I-V behavior is shown in FIG. 3 and can be characterized by several regimes of operations. At low bias levels indicated by the regime 301, the APD is essentially "off" in the sense that it does not respond to illumination. At higher bias indicated by regime 302, the APD operates as a conventional unity gain photo detector. Under illuminated conditions (solid line) the APD produces a higher current than in the unilluminated (dashed curve) state. As the bias is raised further, the device enters regime 303 where it produces avalanche gain, i.e. for each absorbed photon that produces a primary photo-electron the device outputs M electrons, where M is the gain factor. In regime 303, the gain may vary from, for example, less than 10 to greater than 1,000. Further increases in the reverse bias rapidly increases the gain into the so-called sub-Geiger regime 304 where the gain M may reach, for example, from 100,000 to >1,000,000. Still further increases in the reverse bias increases the gain into the Geiger regime 305, which results in Geiger mode operation where each primary photo-electron produces a self-sustained avalanche.

The Geiger mode operation is attractive in some applications because single absorbed photon produces macroscopic currents that can be measured without complex low-noise electronics. However, the Geiger mode operation also has drawbacks, in particular with respect to dead-time. The large currents produced in Geiger mode operation produce trapped charges that trigger secondary avalanches unless the device bias is reduced below the Geiger threshold for a considerable time following a detection event. This time is typically on order 1-2 microseconds for InGaAs family detectors and means that the device is unable to detect more than 0.5-1 million photons per second. It has recently been demonstrated that devices operated in the sub-Geiger mode do not suffer nearly as much from charge trapping and hence there are fewer constraints on how many photons can be detected in a given amount of time. Devices operating in the sub-Geiger mode are of high interest for direct detection ladar applications because they can operate as single-photon sensitive devices utilizing relatively simple electronics.

However, sub-Geiger devices are ill suited for coherent detection for the same reason that Geiger devices are unsuitable. The requirement for a local oscillator beam to be present at a power level similar to the signal power makes them impractical because the signal power level is not a priori knowable.

One embodiment of the present invention is to operate a detector (e.g., APD) at two different bias levels for the two different detection modes. Higher performance detectors can be achieved by meeting two conditions. First, the detector material choice is important. Second, the detector operating modes between which switching is performed is important.

A first consideration in choosing the detector material is excess detector noise. Most detector materials are ill suited for coherent detection when operated as APDs because of excess noise. Excess noise, conventionally denoted by F, arises in APDs because the avalanche gain process is normally not deterministic. If an APD has a mean gain M of 100, a perfectly deterministic electron amplifier would output 100 electrons for every electron put in. However, most real amplifiers produce a probabilistic distribution of gains. The excess noise factor F is conventionally defined as $F=(1+\sigma_M^2/M^2)$, i.e. it depends on the ratio of gain variance to mean squared gain. Only when the gain is deterministic does the excess noise reduce to unity.

Excess noise is highly detrimental to coherent detection ladar systems because the system efficiency or the signal-to-noise ratio (SNR) is inversely proportional to F. For example, if F=2, then the ladar system efficiency is reduced by a factor of 2 compared with an ideal shot noise limited system. In order to compensate for this loss, the transmitter laser power must be doubled. This is very unattractive from a cost, size, weight, and power perspective. Most conventional materials, such as those based on InGaAs, are not suitable for APDs because their excess noise factors are large even for relatively low gains. On the other hand, detectors operated in the sub-Geiger or Geiger modes have low excess noise. Consequently, conventional materials like InGaAs can be operated largely without excess noise problems in the linear (non-APD) regime as well as in the sub-Geiger and Geiger regimes, but not in the APD regime.

A second problem with using sub-Geiger mode devices, as with Geiger-mode devices, for coherent detection is that the currents drawn in sub-Geiger operation are so large that adding an LO beam at any reasonable power level drives it into saturation, where even low LO power levels constantly trigger avalanches. While this is often problematic it can also, as will be discussed below, be used to advantage in enabling dual-mode detector operation determined by the presence or absence of a suitably strong LO beam.

Embodiments of the present invention combine a judicious choice of detector materials, operating points, and a switching network to provide a detector that can be operated as a nearly ideal detector for both coherent and direct detection. The switching network is capable of choosing the operation of the system and this may be performed using electrical, optical or both methods.

Figure 4:
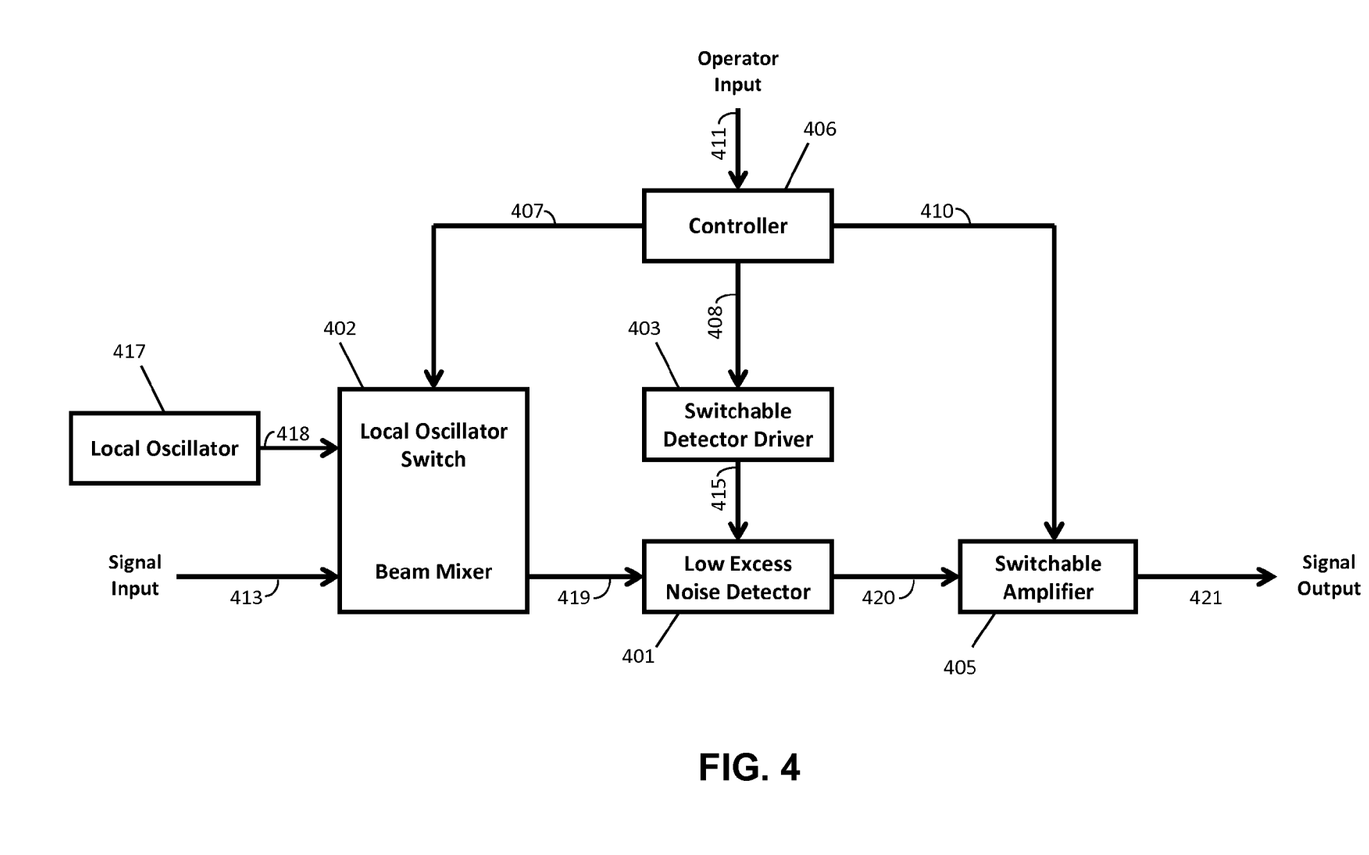
FIG. 4 is a block diagram illustrating a switchable dual-mode detection system according to an embodiment of the present invention.

FIG. 4 shows a block diagram of dual-mode detection system according to an embodiment of the present invention. The detection system comprises a low excess noise detector 401 which can be operated in a high gain regime and a low gain regime shown in FIG. 3. The detection system also comprises a switchable detector driver 403, a switchable optical subsystem 402 and a switchable amplifier 405. The detector 402 is used in conjunction with the three switchable elements 402, 403 and 405 to enable optimized detector operation for coherent and direction detection, as discussed further below. The switchable elements 402, 403 and 405 are controlled through a controller 406 which sends control signals 407, 408 and 410 to the switchable elements 402, 403 and 405 in response to an operator input signal 411 that requests either coherent or direct detection operation. Signal 415 (e.g., reverse bias voltage) changes the operating parameters of the detector 401 based on the selected detection mode, while control signals 407 and 410 condition the input and output of the detection system based on the selected detection mode to enable dual-mode operation.

In operation, an optical signal 413 enters the detection system from the left and propagates into the optical subsystem 402. For a ladar system, the optical signal 413 may be return light scattered from a target illuminated by a lasar. Simultaneously, a local oscillator laser 417 generates a local oscillator beam 418, which propagates into the optical subsystem 402. Depending on whether coherent or direct detection mode is selected, the local oscillator beam 418 is either optically mixed with the optical signal 413 or not. When switched to the coherent detection mode by the controller 406, the optical subsystem 402 optically mixes the local oscillator beam 418 with the optical signal 413 to produce a combined beam 419, which propagates to the detector 401. When switched to the direct detection mode, the optical subsystem 402 passes the optical signal 413 as beam 419 to the detector 401 without mixing. Consequently, beam 419 may or may not incorporate a local oscillator contribution, depending on the selected detection mode.

The switchable detector driver 403 drives the detector 401 with signal 415 into one of two modes of operation based on the control signal 408 from the controller 406. For example, the switchable detector driver 403 may drive the detector 401 into different modes of operation by applying different bias voltages to the detector 401, as discussed further below. Following detection of the beam 419 by the detector 401, the resulting electrical output signal 420 of the detector 401 is input to the switchable amplifier 405. The switchable amplifier 405 amplifies the signal 420 in one of two amplification modes controlled by controller 406 via control signal 410. One amplification mode may be optimized for coherent detection and the other for direct detection. Thus, the switchable amplifier 405 can be set by control signal 410 to operate optimally for either coherent or direct detection. The switchable amplifier 405 outputs an amplified signal 421 for further conditioning or processing by an external system (not shown).

Figure 5:
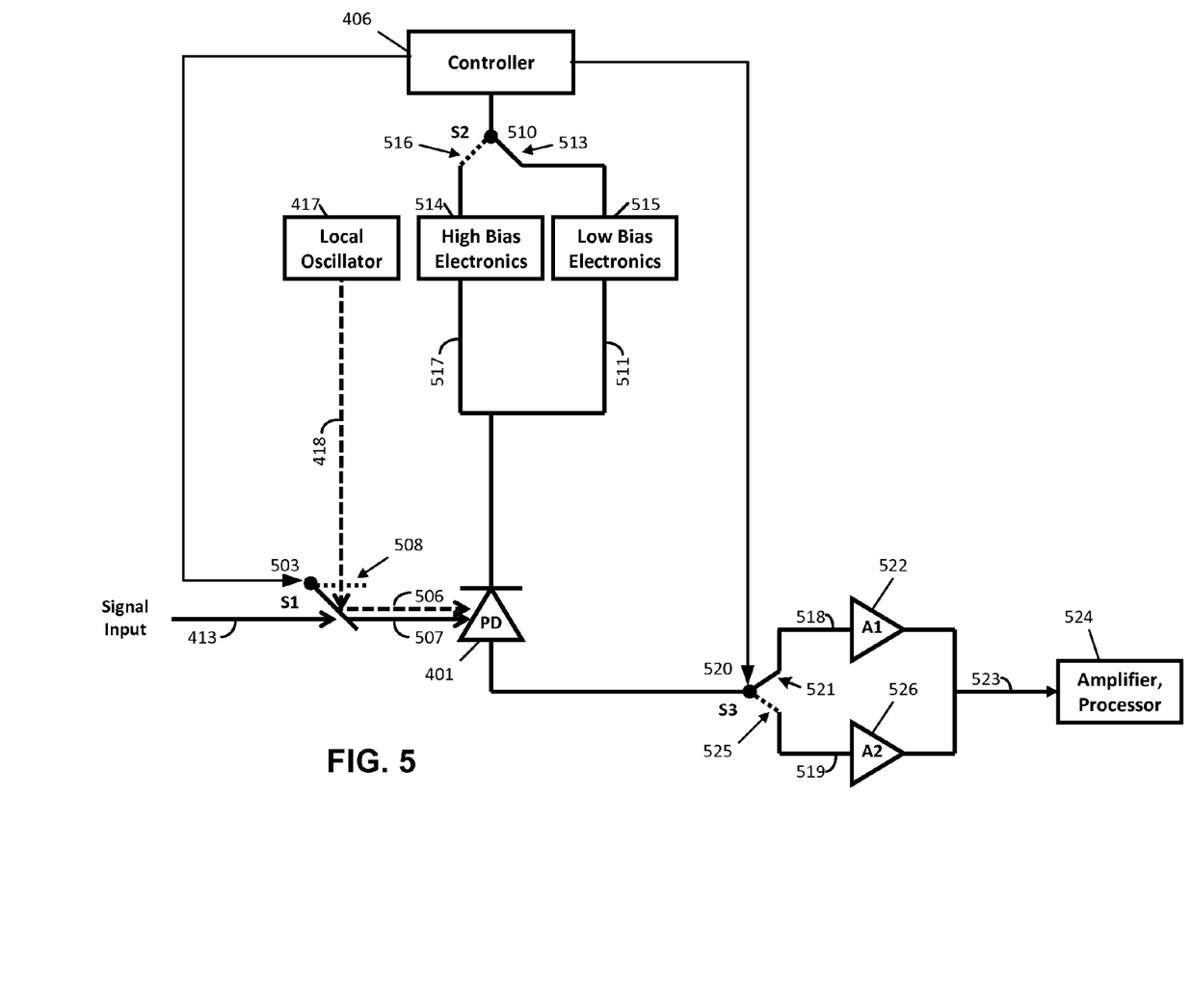
FIG. 5 is a block diagram illustrating the switchable dual-mode detection system in greater detail according to an embodiment of the invention.

FIG. 5 illustrates the dual-mode detection system in more detail according to an embodiment of the present invention. For clarity, the numbering in FIG. 4 has been retained in FIG. 5 for cases where there is a direct correspondence between elements in FIGS. 4 and 5. The correspondence between functional elements in FIG. 4 and an implementation of those elements in FIG. 5 will now be made clear. For the initial description below, it is assumed that the detection system is set to operate in coherent detection mode.

Optical input signal 413 propagates through switch S1 503 and continues to detector 401 as signal beam 507. Simultaneously, a local oscillator optical beam 418 from local oscillator laser 417 propagates toward switch S1 503 where it is reflected to form optical beam 506 that co-propagates with signal beam 507 to photo detector 401. As illustrated in FIG. 5, the switch S1 503 may be implemented with a beam combining partial reflector which is attached to a mechanical element that swings the beam combining partial reflector between to two positions depending on the selected detection mode. The beam combining partial reflector may, for example, transmit 90% of the signal beam 413 power and reflect 10% of the LO beam 418 power. For coherent detection, the beam combining partial reflector is swung into place as shown in FIG. 5. For direct detection, the beam combining partial reflector is swung into position 508 denoted by the dotted line. In the latter position, the local oscillator beam 506 is blocked and only signal beam 507 propagates to the detector 506. Alternative embodiments of this switch are discussed below.

For coherent detection, beams 506 and 507 co-propagate to the detector 401. In a preferred embodiment, the detector 401 is made from mercury-cadmium-telluride (also denoted MCT or HgCdTe). A property of MCT is that it enables APD detectors having nearly deterministic gain (F~1.1 or less) to be constructed. Such detectors can be operated at or near room temperature with very high optical quantum efficiency in excess of 90%. For coherent detection, it is not necessary to have very high gain. Exactly how much gain is needed depends on the application and system parameters. Avalanche or APD gain is used in coherent detection for two related purposes. One is to reduce the amount of local oscillator power required to produce shot-noise limited detection. The other is to permit shot noise limited operation with relatively noisy transimpedance amplifiers (TIA), since the latter frequently limit the noise performance. It can be shown that for a given amount of TIA noise, the local oscillator power requirement drops as $1/M^2$, which means, for example, that a gain of only 10 permits a local oscillator power reduction by a factor of 100. For example, a system with an operating bandwidth of for example 1 GHz, APD gains in the 10-30 range are frequently sufficient to reduce the local oscillator power requirements from, for example, 1 mW of optical power to 1-10 microW. This power reduction may or may not be important for single pixel systems. However, for imaging systems that may comprise a large number of detector elements such power reduction is very much desired in the system design.

In a preferred embodiment, the detector 401 is operated in the avalanche gain regime 303 for coherent detection and operated in the sub-Geiger regime 304 for direction detection. Operation in the sub-Geiger regime for direct detection rather than the avalanche gain regime 303 is preferable since the very high gains in the sub-Geiger regime strongly reduces the need for complex and low noise amplifier stages to enable single-photon detection. At the same time the sub-Geiger regime is preferred over the Geiger regime 305 because of the much faster recovery time of the detector 401 following a detection event.

In one embodiment, the detector 401 is switched between operating in the avalanche gain regime 303 and the sub-Geiger regime 304 by switching the reverse bias applied to the detector 401 between a low value to a high value, respectively. This may be accomplished by a switch S2 510 which enables controller 406 to connect either low bias circuitry 515 to the detector 401 or high bias circuitry 514 to the detector 401. The low bias circuitry 515 may apply a low voltage reverse bias to the detector 401 to operate the detector in the avalanche gain regime 303 and the high bias circuitry may apply a high voltage reverse bias voltage to the detector 401 to operate the detector 401 in the sub-Geiger regime. For coherent detection, the controller 406 connects the low bias circuitry 515 to the detector 401 via path 511 with the switch setting illustrated by solid line 513. For direct detection, the switch 510 is set to the alternate position indicated by dotted line 516, which connects the high bias circuitry 514 to the detector 401 via path 517. While the two bias circuits 514 and 515 are shown as two separate blocks, in an alternative embodiment they may be constructed in such a manner that a single circuit fulfills both purposes.

In an embodiment, a series resistor (not shown) or a similar function element may be provided for operating detector 401 in the sub-Geiger mode (sometimes referred to as negative feedback avalanche diode, NFAD, or other terminology) for direct detection. The resistor may be provided in the path 517 between the high bias circuitry 514 and the detector 401. The resistor may also be provided in the current path of the detector 401 with a switch connected in parallel with the resistor. For direct detection, the switch may be open so that the current of the detector 401 flows through the resistor. For coherent detection, the switch may be closed so that the current bypasses the resistor. The switch may be controlled by the controller 406 based on the selected detection mode.

This resistor provides negative feedback that limits the current of the detector 401 from reaching the full Geiger condition in direct detection mode. When the detector 401 is dark (un-illuminated) it draws negligible current. However, as the detector 401 is illuminated, the detector rapidly builds up a macroscopic current which flows through the series resistor. Consequently, a voltage drop occurs across resistor leading to a reduction in the bias across detector 401, and hence a reduction in the gain. This gain reduction terminates the avalanche. This mode of operation is different from the coherent detection mode where a constant current flows through the detector 401 due to the presence of the LO induced photo current and the signal manifests itself as a typically weak fluctuation in the photo current. The resistor or similar element may be tuned to a specific value in order to operate optimally in direct detection mode, but this value is not necessarily optimal or desired for coherent operation.

Depending on the selected detection mode, the form of the output photo current from the detector 401 will vary. In coherent detection mode, the current has a large DC value with a small AC modulation due to the coherent mixing of the signal beam 507 and the LO beam 506. In direct detection mode, however, the current output consists of short (such as on order 0.1 to 10 ns) current spikes corresponding to detection of individual photon events.

To optimize amplification for the two different detection modes, the detection system comprises a first amplifier A1 522 optimized for coherent detection and a second amplifier A2 526 optimized for direction detection. The output of the detector 401 is connected to the first amplifier A1 522 or the second amplifier A2 526 by a switch S3 520 depending on the selected detection mode indicated by the controller 406. For coherent detection, the controller 406 sets the switch 520 to the position indicated by solid line 521, which directs the output photo current of the detector 401 to the first amplifier A1 522 via path 518. The output of the first amplifier A1 522 is input to an amplifier/processor system 524 via path 523. The amplifier/processor system 524 may incorporate further amplification and/or perform signal processing circuitry to extract information from the detected photo current.

For direct detection, the controller 406 sets the switch 520 to the path position indicated by dotted line 525, which directs the output photo current of the detector 401 to the second amplifier A2 526. The output of the second amplifier A2 526 is also input to an amplifier/processor system 524 via path 523.

Operations of the switchable dual-mode detection system may summarized as follows. The controller 406 receives a signal indicating a desired detection mode. Based on the desired detection mode, the controller 406 sets switch S1 (503) to either block the local oscillator beam 418 or mix the local oscillator beam 418 with the optical signal 413, sets switch S2 (510) to apply a low bias or a high bias to the detector 401, and sets switch S3 (520) to direct the output photo current of the detector 401 through the amplifier path optimized for the desired detection mode.

Figure 6A:
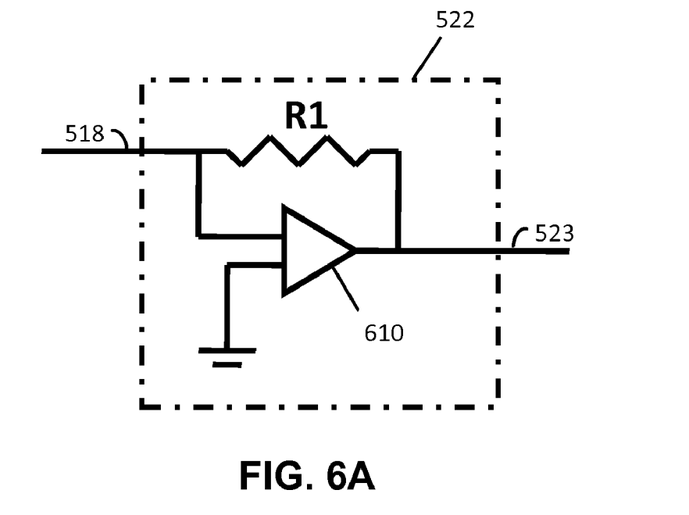
FIGS. 6A and 6B illustrate amplifier configurations for coherent detection and direct detection, respectively, according to an embodiment of the invention.
Figure 6B:
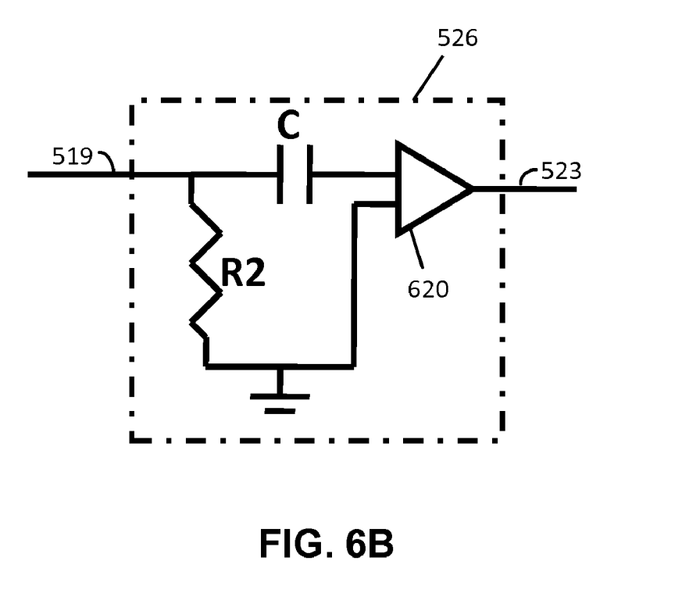

FIG. 6A illustrates the first amplifier A1 522 according to an embodiment of the invention. In this embodiment, the first amplifier A1 522 comprises a resistor R1 and an amplifier 610 arranged in a transimpedance amplifier configuration. FIG. 6B illustrates the second amplifier A2 526 according to an embodiment of the invention. In this embodiment, the second amplifier 526 comprises a capacitor C, a resistor R2 and an amplifier 620 arranged in a voltage amplifier configuration.

Those skilled in the art will appreciate that there are various other embodiments of the present invention, examples of which are discussed below.

A key to optimized operation in coherent and direct detection modes is the achievement of high detection efficiency and low excess noise. As discussed above, both of these conditions can be met with a detector intrinsically capable of being operated as an APD with low excess noise. MCT is one example of a suitable APD material; however, any other detector and/or material that meets the low excess noise criterion is suitable. Other examples include I²E (impact ionization engineering) materials that achieve low excess noise by engineering multi-layer devices, each one operated at low gain. It is also not strictly required that the device for coherent detection mode operates in the APD regime. It could also be operated at lower bias in the unity gain regime. An advantage of switching between sub-Geiger mode and unity gain mode is that the excess noise associated with common materials like the InGaAs family is no longer a concern. A disadvantage is that substantially higher local oscillator power levels are required when detector gain >>1 is not used.

An advantage of switching between sub-Geiger and APD regimes as disclosed above, is that it enables construction of detector arrays without requiring very large LO powers. For example, a 1,000 element array requiring 1 mW of LO power per pixel to be shot-noise limited would require 1 W of optical power at the array. If the same array operated with a gain of 31 the total LO power requirement would only be 1 mW. The distinction between these LO power levels is significant both in terms of power dissipation in the detector array and in the generation of high power LO beams.

Further, those skilled in the art will appreciate that, while switching between sub-Geiger and APD gain or unity gain modes is in many cases ideal, it is also possible to switch between Geiger-mode and avalanche mode or between Geiger-mode and unity gain mode.

As discussed above one key for optimal operation of the detection system is that the detector bias is adjusted correctly for direct and coherent modes. It has also been noted above that a series feedback resistor may be provided to control the bias across the detector depending upon the current flow through resistor. It is possible then to adjust parameters, including the resistor value and the local oscillator power, such that in the absence of the local oscillator beam the device is operated in the sub-Geiger regime, whereas with the significant and correct amount of local oscillator light applied, the photo current in the detector causes enough voltage drop across resistor that the bias voltage across the detector reduces the gain to a desired operating point for coherent detection. In effect, this yields optical switching of the APD into the avalanche gain region of 303 in FIG. 3 and yields a method of optical selection between the coherent and direct detection using the LO switch 402 without the need for switching detector driver 403.

In an alternate embodiment of the invention, the APD and under significant and correct amount of local oscillator will reduce its gain due to intrinsic device gain saturation (APD internal electric field reduction). Optical switching between the coherent and direct mode is in this case achieved using exclusively the LO switch 402, without the need for switching detector driver 403.

Those of skill in the art would appreciate that the various illustrative blocks, modules, elements, components, methods, and algorithms described herein may be implemented as electronic hardware, computer software, or combinations of both. For example, the controller 406 may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A dual-mode detection system switchable between a direct detection mode and a coherent detection mode, the receiver comprising:
   a photo detector;
   a local oscillator laser configured to generate a local oscillator beam;
   an optical subsystem configured to mix a signal beam with the local oscillator beam to produce a combined beam and direct the combined beam to the photo detector or direct the signal beam to the photo detector without mixing; and
   a controller configured to switch the system between the direct and coherent detection modes, wherein, in the coherent detection mode, the controller is configured to operate the photo detector in a low gain mode and to control the optical subsystem to mix the signal beam with the local oscillator beam to produce the combined beam and direct the combined beam to the photo detector, and wherein, in the direct detection mode, the controller is configured to operate the photo detector in a high gain mode and to control the optical subsystem to direct the signal beam to the photo detector without mixing.

2. The dual-mode detection system of claim 1, wherein the local oscillator beam optically switches the photo detector between the high gain mode and the low gain mode.

3. The dual-mode detection system of claim 1, further comprising a detector driver for electrically switching the photo detector between the high gain mode and the low gain mode, wherein the controller is configured to control the detector driver to drive the photo detector in the high gain mode for direct detection and to drive the photo detector in the low gain mode for coherent detection.

4. The dual-mode detection system of claim 3, wherein the photo detector comprises a photo diode, and the detector driver is configured to reverse bias the photo detector with a low voltage in the low gain mode and to reverse bias the photo detector with a high voltage in the high gain mode.

5. The dual-mode detection system of claim 1, wherein the photo detector comprises an avalanche photo detector.

6. The dual-mode detection system of claim 5, wherein the photo detector operates in a sub-Geiger regime or a Geiger regime in the high gain mode.

7. The dual-mode detection system of claim 5, wherein the photo detector operates in an avalanche gain regime or unity gain regime in the low gain mode.

8. The dual-mode detection system of claim 5, wherein the photo detector comprises mercury cadmium telluride (MCT).

9. The dual-mode detection system of claim 5, wherein the photo detector comprises impact ionization engineering ($I^2E$) device structure.

10. The dual-mode detection system of claim 1, wherein the controller is configured to disable the local oscillator laser in the direct detection mode.

11. The dual-mode detection system of claim 1, wherein the optical subsystem comprises an optical switch configured to block the local oscillator beam from the photo detector in the direct detection mode and to combine the local oscillator beam with the signal beam in the coherent detection mode.

12. The dual-mode detection system of claim 11, wherein the optical switch comprises:
   a beam combining reflector; and
   a mechanical actuator configured to swing the beam combining reflector between a first position and a second position corresponding to the direct detection mode and the coherent detection mode, respectively.

13. The dual-mode detection system of claim 1, further comprising:
   a first amplifier;
   a second amplifier; and
   a switch configured to direct an electrical output signal from the photo detector to one of the first and second amplifiers, and the controller is configured to control the switch to direct the electrical signal to the first amplifier in the coherent detection mode and to direct the electrical signal to the second amplifier in the direct detection mode.

14. The dual-mode detection system of claim 13, wherein the first amplifier comprises a transimpedance amplifier and the second amplifier comprises a voltage amplifier.

15. The dual-mode detection system of claim 1, wherein the photo detector comprises an array of detection elements.

16. A method of switching a detection system comprising a photo detector between a direct detection mode and a coherent detection mode, the method comprising:
   receiving a signal beam;
   in the coherent detection mode, performing the steps of
      mixing the received signal beam with a local oscillator beam to produce a combined beam;
      directing the combined beam to the photo detector; and
      operating the photo detector in a low gain mode; and
   in the direct detection mode, performing the steps of
      directing the received signal beam to the photo detector without mixing; and
      operating the photo detector in a high gain mode.

17. The method of claim 16, further comprising optically switching the photo detector between the high gain mode and the low gain mode using the local oscillator beam.

18. The method of claim 16, wherein the photo detector comprises a photo diode, the driving the photo detector in the low gain mode comprises applying a low voltage reverse bias to the photo detector, and the driving the photo detector in the high gain mode comprises applying a high reverse bias voltage to the photo detector.

19. The method of claim 16, wherein the photo detector operates in a sub-Geiger regime or a Geiger regime in the high gain mode.

20. The method of claim 16, wherein the photo detector operates in an avalanche gain regime or unity gain regime in the low gain mode.

21. The method of claim 16, further comprising disabling the local oscillator laser in the direct detection mode.

22. The method of claim 16, wherein the detection system comprises a first amplifier and a second amplifier, further comprising directing an output photo current of the detector to the first amplifier in the coherent detection mode and directing the output photo current to the second amplifier in the direct detection mode.

23. The method of claim 22, wherein the first amplifier comprises a transimpedance amplifier and the second amplifier comprises a voltage amplifier.

* * * * *